United States Patent Office 3,000,377
Patented Sept. 19, 1961

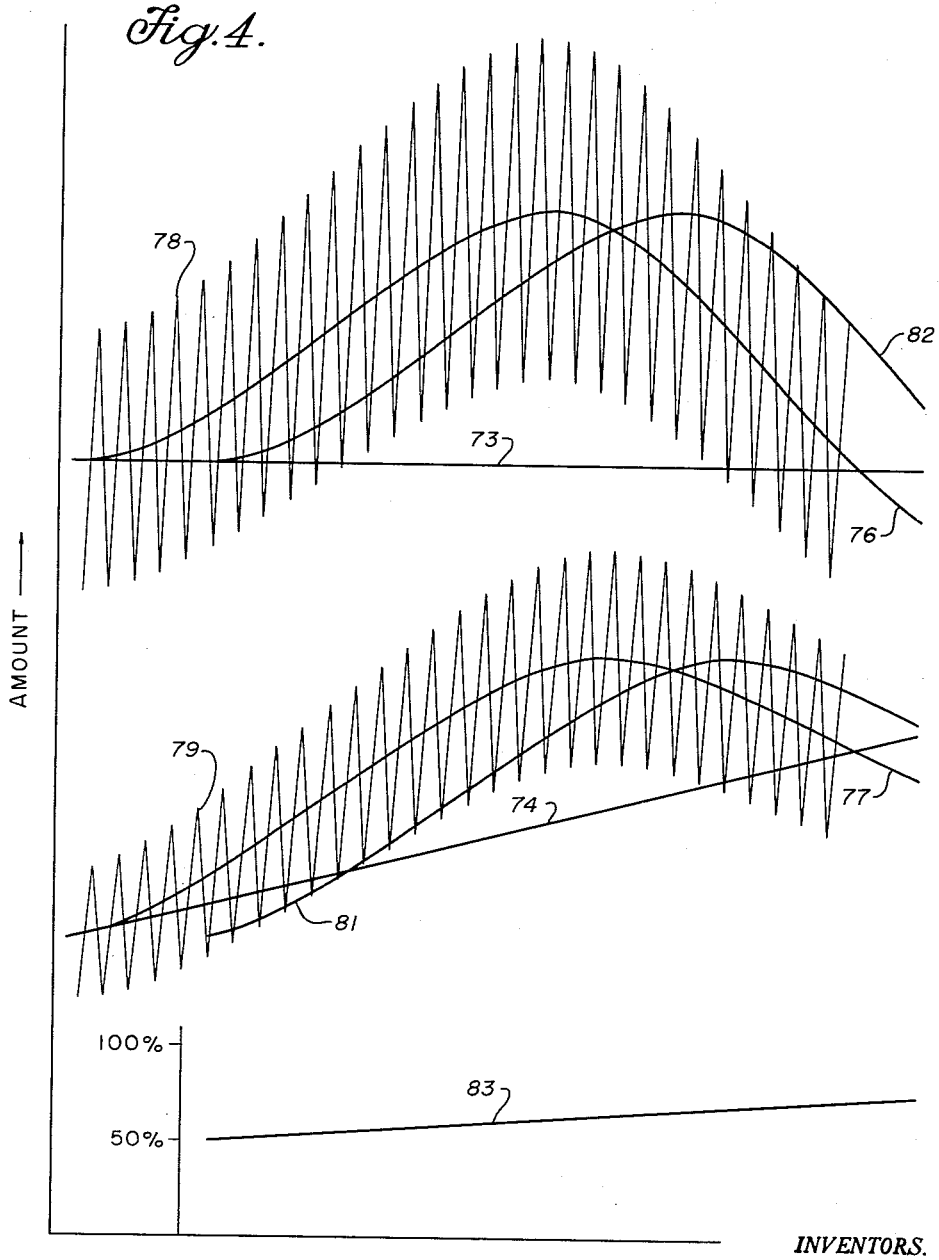

3,000,377
METHOD AND APPARATUS FOR METABOLIC ASSAY
Bert M. Tolbert, Berkeley, Martha R. Kirk, Concord, and Elton M. Baker, Berkeley, Calif., assignors to the United States of America as represented by the United States Atomic Energy Commission
Filed May 10, 1956, Ser. No. 584,154
17 Claims. (Cl. 128—2.07)

The present invention relates to methods and apparatus for measuring the respiratory excretion of a human or animal, and more particularly to methods and apparatus for measuring the respiratorally excreted products resulting from the ingestion of radiation labelled compounds in such humans or animals.

A class of measurement important in medical diagnosis and in biochemical research includes the respiratory study, and in particular the metabolism test, used for observing the manner in which the system of an animal stores or distributes and synthesizes or reduces various metabolic substances administered thereto. Such tests generally comprise the determination in some way of a respiratory quotient, that is, the ratio by volume of oxygen consumption to carbon dioxide exhalation, wherein the carbon is supplied by metabolic processes taking place within the body. One difficulty with such a test, particularly when it is used on lower animals, is that often any increase or decrease in the physical activity of the subject introduces an artificial or at least an irrelevant variation in the rate of all these metabolic processes, as well as in their sum. But generally such variations in physical activity affect all these processes in like degree. If the rates of certain biological processes are periodically measured as specific proportions of the total metabolism rate, and if the values found are then plotted in graphical form along a time axis, it will be seen that the occasional fluctuations caused by the subject's physical activity are eliminated; that is to say, the resulting curve for any particular process is comparatively smooth and more accurately represents the unstimulated functioning of the subject's biological system. A more particular and a more important advantage, however, is that the specific workings of many individual processes can be studies, and inferences can be made about still other processes that are not directly observable.

The successful application of this general procedure involves the administration of a food known to be absorbed by some particular process into the system of the subject, and the making of an accurate assay of consequent exhalation. Prior to development of the present invention, it has occasionally been attempted to inject a subject with a labelled metabolic compound, that is, a compound containing radioactive carbon that upon excretion is measured by means of a counting device separately from the total amount of carbon dioxide. But this general method as heretofore practiced has always contemplated that substantial increments of the exhaled mixture must be laboriously collected in bottles for measurement, resulting in undue expenditure of time and effort, the introduction of many possibilities for error, and, most important, the impossibility of obtaining a continuously instantaneous record.

In the present invention, the subject is injected with a compound containing radioactive $C^{14}$. The exhaled gases are collected, are partially mixed with fresh air, and are then caused to flow along a prescribed path, at one point of which the instantaneous local concentration of radioactive $C^{14}O_2$ is electronically monitored, and at another point of which the instantaneous local concentration of $CO_2$ is electronically monitored; and the instantaneous measurements from the two monitoring instruments are continuously compared and recorded. Variations in the response times of the measuring instruments are eliminated by the novel procedure of controlling the process of inter-diffusion undergone by the gases between the two points of measurement, thus doing away with a large amount of electronic circuitry that would otherwise be required.

It is accordingly an object of the present invention to provide a method for making continuous comparative measurements of selected metabolic processes in human and animal subjects.

It is another object of this invention to provide a method and apparatus for continuously measuring respiratorally excreted products resulting from the ingestion of labelled metabolic substances in human and animal subjects.

It is still another object of the invention to provide a method and apparatus for making a continuous comparative measurement of carbon dioxide respiratorally excreted by human and animal subjects and of a radioactive portion of such carbon dioxide resulting from the ingestion of a labelled metabolic substance in such subject.

It is a further object of this invention to provide a more economical and more simply constructed apparatus for continuously assaying a flow of partially mixed fluids.

It is a still further object of the invention to provide a method and apparatus, applying to a flow of partially-mixed fluids, for making a continuous local assay of such flow at a selected place in the path of such flow.

It is still a further object of the invention to provide a method and apparatus for more conveniently synchronizing the responses of a plurality of automatic measuring instruments, when such instruments are used for assaying a flow of partially-mixed fluids.

It is another object of the invention to provide a means for reducing the effects of background radiation in the detection of low-level radioactivity which may be present in a substance.

The invention, both as to its organization and method of operation, together with further objects and advantages thereof, will best be understood by reference to the following specification taken in conjunction with the accompanying drawing, of which:

FIGURE 4 is a series of curves illustrating an aspect of the operation of the apparatus;

Figure 1:
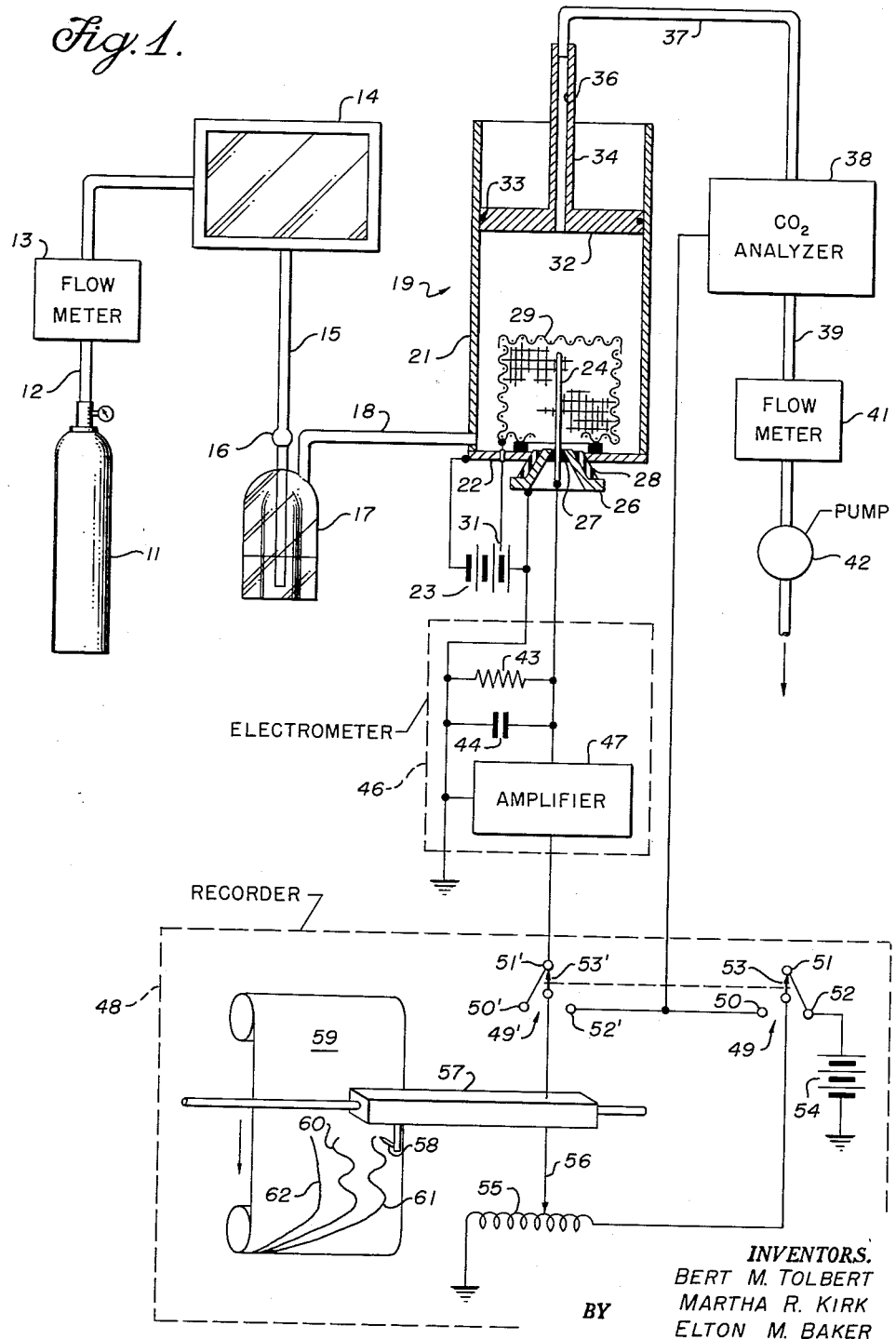
FIGURE 1 is a schematic drawing of the apparatus utilized in this invention.

Referring now to the drawing and, more particularly, to FIG. 1, there is shown a compressed air bottle 11 communicating by a conduit 12, through a flow meter 13, to a cage 14, which may be in the form of a windowed helmet suitable for fitting over the head of a human being, or alternatively, a container holding an animal to be tested. An exhaust conduit 15 leads from the cage 14, through a safety trap 16, to an air dryer 17, which may be of any suitable type, but which is shown in the present embodiment as a sulfuric acid bubbler. An intermediate conduit 18 leads from the dryer 17 to an ionization chamber 19.

It will be understood that the subject animal inhales pure air from the bottle 11 and, having been injected with a test compound containing radioactive $C^{14}$, exhales carbon dioxide containing a proportion of radioactive matter corresponding with the rate at which the test material is being oxidized to $CO_2$. The ionization chamber 19 is provided for the purpose of measuring such exhaled radioactivity, and is formed as a hollow cylinder 21 having a fixed end wall 22, the whole being electrically connected to a voltage source 23 of negative potential with respect to ground, such potential being on the order of —300 volts in the present embodiment. Thus, electrons formed in the flowing gases by ionizing action of the $C^{14}O_2$ are drawn toward the axis of the chamber, there to be collected upon an axial electrode rod 24. The rod 24 is positioned transpiercing the end wall 22 of the chamber and is spaced in passage therethrough by means of a coaxial cylindrical shield 26 having two insulating rings 27 and 28, the first disposed between the rod and shield and the second disposed between the shield and wall. The shield 26 is furthermore positioned to comprehend the protruding extremity of the electrode 24, and is electrically grounded to attract away from that electrode any electrons repelled through the outside atmosphere by the strongly biased chamber wall 22, which electrons might otherwise produce spurious counts in the recording apparatus later to be described.

To make possible the detection of the weak beta activity emanating from such very minute quantities of $C^{14}$ as may be administered without causing harm to the animal under experiment, provision is made for reducing the background of alpha and other charged particle activity to which the ionization chamber is normally subject. It is of help to use air that has been stored in the bottle for a sufficiently long time that the inherent contamination of the air shall have decayed. But it is also desirable to reduce the effects of alpha particles and of cosmic ray electron showers that may be produced in the walls of the chamber itself and to this end there is provided what constitutes one of the unique features of the invention. A cylindrical screen grid 29 is disposed in the lower portion of the chamber 19, enclosing a substantial volume around the electrode 24, and spaced substantially away from the wall 21 of the chamber so as to be beyond the range of alpha particles originating in the wall. The grid 29 is charged to a certain potential, which, in general, may be any potential except those of the electrode and the chamber wall, and is thus adapted to prevent charged particles that are generated outside the grid volume from impinging upon the electrode 24. If, in respect to the chamber wall, the grid 29 is charged positively, then it repels positive particles and collects electrons; and if charged negatively, it has the opposite effect. In the embodiment shown in the drawing, the grid 29 is charged to a value intermediate between those of the electrode 24 and the chamber wall 21, by connection to an intermediate tap 31 on the voltage source 23. Preferably, the grid 29 is formed of a fine mesh, presenting relatively minor surface areas to be struck by the impinging particles, so that relatively few recoil particles are emitted therefrom; and it is also made of a material having a low level of natural radioactivity, such as stainless steel.

The structure of the ionization chamber 19 is completed by another unique element of the invention, the operation of which will be described in more detail hereinafter. Such element comprises a piston 32, slideably disposed within and sealingly fitted against the cylindrical wall 21 of the chamber with a flexible toroidal seal 33 interposed and seated into an appropriate recess of the piston. A piston stem 34, formed integrally with the piston 32, projects coaxially from the outer side thereof; and both stem and piston are coaxially bored for a continuous channel 36, by means of which the gases that have passed through the sensitive volume of the chamber are drawn off. The gases are conducted by a conduit 37 to a carbon dioxide analyzer 38 of standard manufacture, and thence by a conduit 39, through a second flow meter 41, to a pump 42, whence they are exhausted into the outside atmosphere.

Now, in any increment of gases flowing through the system, the total amount of carbon dioxide, and that part of the carbon dioxide that is radioactive, are respectively expressed by the $CO_2$ analyzer 38 and by the ionization chamber 19 as output signals, of which it is desired to record and compare the continuously changing values. The electrode 24 is therefore coupled to ground through a parallel connected resistor 43 and capacitor 44, comprising a resistance-capacitance integration circuit for smoothing out the wave form of the electrode voltage, which otherwise would be modulated to reflect the succession of spaced increments by which the subject breathes. This circuit forms the input cricuit of an electrometer 46, which includes an amplifier 47 having again suitable for producing an output voltage of the same general magnitude as that of the $CO_2$ analyzer 38.

For comparison of the two outputs, there is provided a recorder 48, which is of standard manufacture, but which is especially adapted for the purpose, as will now be described. A pair of three way switches 49 and 49', each having three fixed contacts respectively numbered 50, 51, 52, and 50', 61', 62', are disposed so that the contacts having corresponding numbers are contacted in pairs, and the pairs in sequence, by rotary contactors 53 and 53'; and the rotary contactors are suitably driven by a single motor not shown in the drawing. At switch 49, the fixed contact 50 is connected to the output of the $CO_2$ analyzer 38, the fixed contacts 51 and 52 are connected to a standard voltage source 54 that is positive with respect to ground, and the rotary contactor 53 is connected to ground through a potentiometer slide-wire 55. At the switch 49', the fixed contacts 50' and 51' are connected to the output of the electrometer 46, the fixed contact 52' to the output of the $CO_2$ analyzer 38, and the rotary contactor 53' is connected to the slide contactor 56 of the potentiometer. A servo mechanism 57 is linked to the contactor 56 and is adapted to align the contactor at that point on the slide-wire 55 that corresponds with null current flow in the circuit. An inked pen 58, also linked to the servo mechanism 57, is thereby translated correspondingly with the slide contactor 56, and is adapted to make dots periodically upon a transversely moving scroll 59, such dots representing ordinate points of a graph. Thus it may be seen that, as the rotary contactors 53 and 53' rotate in unison, the output potentials of the electrometer 46 and of the $CO_2$ analyzer 38 are compared in sequence to the standard potential of the source 54 and then to each other, so that there are plotted on the scroll 59 a $C^{14}O_2$ graph 60, a $CO_2$ graph 61, and a specific activity graph 62 representing the constantly changing ratio of $C^{14}O_2$ to $CO_2$.

It will be seen that the ionization chamber 19 and the $CO_2$ analyzer 38 constitute a pair of "meters," which may also be called "monitors," a term widely used in the radiation art to mean the same thing.

It must be understood that proper operation of the above-described apparatus involves special adjustment to compensate for a number of variable time delays, the most important of which is the very great difference between the electronic response times of the $CO_2$ analyzer and the combination of ionization chamber and electrometer. While such sources of error are correctable by means of additional electronic circuitry, the equipment required would be disproportionately elaborate and expensive; and it is in fact the simplified apparatus and method provided herein for making such adjustment that comprise one of the most important features of the invention.

Figure 2:
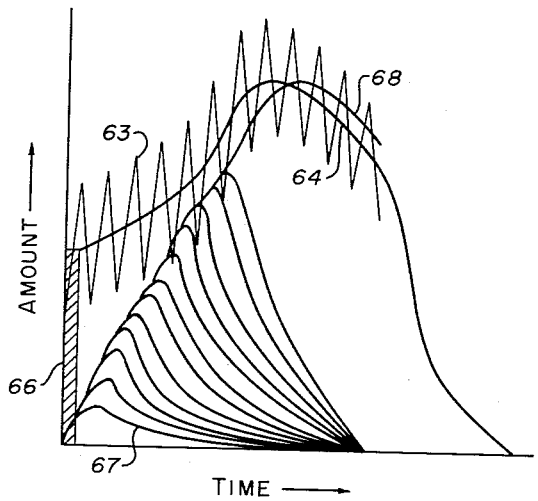
FIGURE 2 is a gas curve illustrating the operation of a portion of the apparatus.
Figure 3:
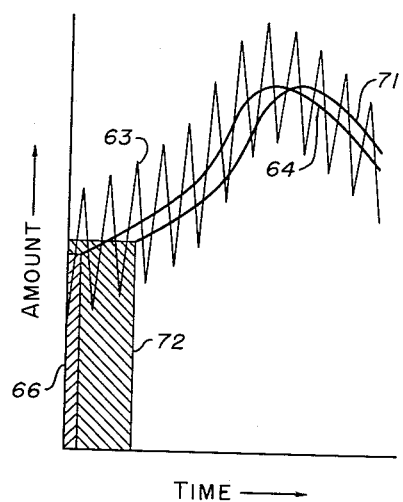
FIGURE 3 is a second gas curve illustrating the operation of another portion of the apparatus.

The functioning of the timing mechanism is illustrated in FIGS. 2, 3, and 4. Referring now to FIG. 2, there is shown a modulated gas curve 63, illustrating the manner in which a gas such as the $C^{14}O_2$ enters a selected portion of the flow system, such as the volume defined by the grid 29 of the ionization chamber, where the radioactivity of the gas is to be assayed by the electrode 24. Each rise and fall of the curve represents an increase and decrease resulting from the exhalation of a single breath by the test subject, and each breath is shown as having been already partially mixed with other breaths in the cage 14 and in transit to the grid 29, so that the curve never falls to a zero value. The true average amount of gas in each breath is described by an average curve 64; and this curve is derived by plotting the ordinates of a succession of time increments such as an increment 66, the area of which is equal to the area enclosed beneath the gas curve 63 for the same period of time.

Now, it is desired that the electrometer 46 be adapted to relay a signal having the shape of the average curve 64 rather than that of the original gas curve 63, for, as has already been pointed out, the recorder 48 plots points upon the scroll 59 only at comparatively widely spaced intervals of time. If, therefore, the recorder were to follow the gas curve 63, the plotted points would be sometimes quite high and sometimes quite low, and it would be difficult to correlate such values with those supplied by the $CO_2$ analyzer 38. The function of averaging or smoothing out the gas curve 63 is performed by the parallel coupled resistor 43 and capacitor 44, which attenuate the signal coming from the electrode 24, as a result of the assay of each breath, in a manner well known to the art. For example, there is shown on the drawing a breath curve 67, the ordinates of which represent output voltage from the resistance-capacitance circuit 43—44. The rising portion of this curve corresponds with the charging curve of the capacitor in combination with the resistance, and the falling portion represents the discharge of the capacitor through the resistance to ground. The signal for each successive breath is added to those preceding it as schematically contoured on the drawing for the first six breaths, and the resulting total signal follows a pattern that is represented on the drawing by a signal curve 68, which, starting from zero, quickly builds up until it assumes a shape almost exactly similar to that of the true average curve 64, though somewhat delayed in time.

The referenced time delay must be taken into consideration as an inherent characteristic, necessary to and concomitant with the proper functioning of the electrometer, for the delay is directly proportional to the product RC, in which C represents the value of the capacitance in farads and R represents the value of the resistance in ohms; and the product RC is in turn directly proportional to the accuracy with which the signal curve 68 approaches the precise shape of the average curve 64. Also, the circuit as used in the present invention must have a substantial resistance for the additional reason that the value for R is directly proportional to the amplification factor of the circuit; that is, the ratio of the input to ouput voltage. Thus a small value for R would mean that correspondingly larger doses of $C^{14}$ would have to be administered to the subject in order to provide a signal strong enough to be picked up by the electrometer amplifier circuit, and this procedure would operate against the continued good health of the subject. The time delay therefore becomes a parameter that is subject to only limited adjustment in the present apparatus, posing the further problem of obtaining a similarly delayed, smoothly averaged curve for the $CO_2$ signal emanating from the analyzer 38; for the time delays of the two signals must be equal or they cannot be properly plotted on the scroll.

The built-in time response of commercially manufactured $CO_2$ analyzers, such as the one employed in the present embodiment of this invention, is ordinarily quite short. While it would be possible to insert a capacitance-resistance circuit into the signal line between the analyzer and the recorder, the capacitance required would be excessively large and inordinately expensive; and it has been found preferable to use the method and structure now to be described, such being an important feature of the invention.

Referring now to FIG. 3, there are shown a gas curve 63, an average curve 64, and a small time increment 66, representing the average value of the first half breath of such gas. As was pointed out in connection with FIG. 2, it is by plotting the ordinates of such small time increments that the average curve 64 is derived. By physical analogy, then, if the exact amount of gas present in such half breath were to be diffused to an homologous state within a given volume, then every assay made of the concentration of the gas at any point within such volume would give the same value, which is the value of any ordinate of the increment 66. Such would be the result if the flowing gases coming into the ionization chamber 19 were to be chopped into tiny parts and segregated, and then assayed after the $CO_2$, for example, has been caused to mix or diffuse to an homologous state with the air likewise trapped in each small increment volume; and a curve corresponding closely to the average curve 64 could then be plotted. However, it has been found to be possible, by taking larger and larger increments for assay, to plot a curve that is more and more delayed in time. Such a curve is shown as a delayed-average curve 71, which is plotted on the drawing from averaged increments such as the large increment 72, five times as broad in time as the small increment 66. In practice, a similar result is obtained in the present invention by increasing the volume of the ionization chamber 19, that is, by withdrawing the piston 32 to enclose a larger volume. Thus larger increments of the gases flowing through the chamber are caused to mix in passage, and the $CO_2$ analyzer actually assays a concentration of $CO_2$ that is illustrated by the delayed-average curve 71. In effect, it may be said that while the $C^{14}O_2$ signal is demodulated or smoothed out after its assay, the $CO_2$ flow is demodulated prior to assay, and by mechanical means rather than by electrical. It will also be quite obvious that the time delay of the $CO_2$ signal may be adjusted to conform to that of the $C^{14}O_2$ signal at will, simply by changing the position of the piston 32.

The last problem to be dealt with in discussing the timing of the illustrated embodiment is that of the fluctuations in metabolism rate caused by increase and decrease of the physical activity of the test subject, it being desirable to eliminate such fluctuations from the final plotted curve representing the proportion of $C^{14}O_2$ to $CO_2$. Referring now to FIG. 4, there is illustrated the entire functioning of the apparatus from assay to recording. First, it will be understood that the $CO_2$ average curve, were it not distorted by the physical activity of the subject, would generally come out as a horizontal straight line such as is represented by a $CO_2$ undistorted-average curve 73 indicating the basic metabolic level of the subject. But the amount of $C^{14}O_2$ excreted would vary slowly over a period of time, and it is represented in the drawing, as an increasing function, by a $C^{14}O_2$ undistorted-average curve 74 showing the increasing consumption of the injected $C^{14}$. The $CO_2$ true average is shown by a $CO_2$ true-average curve 76, which also directly describes the variations of the subject's physical activity; and that of the $C^{14}O_2$ is shown by a $C^{14}O_2$ true-average curve 77. The two gases also are shown, as if instantaneously assayed upon entering the ionization chamber, by a $CO_2$ gas curve 78 and a $C^{14}O_2$ gas curve 79. The output signals as relayed by the electrometer and the analyzer are shown as a $C^{14}O_2$ delayed-average curve 81 and a $CO_2$ delayed-average curve 82, the time delay of the latter having been adjusted to equal that of the former by means of the piston 32. Now it will be noted that, upon dividing various ordinates of the $C^{14}O_2$ delayed-average curve 81 by corresponding ordinates of the $CO_2$ delayed-average curve 82, values are obtained that when plotted on the graph give a $C^{14}O_2$ to $CO_2$ specific activity curve 83, in this case a straight line function of the same class as the $C^{14}O_2$ undistorted-average curve 74. This specific activity curve 83, though delayed in time and though not of the same slope as the basic curve 74, is nevertheless related directly thereto, and from it, if desired, the basic curve may be derived. The specific activity curve 83 is in fact the same as the specific activity graph 62, previously described as being the final object for the functioning of the apparatus. It will readily be seen that the fluctuations caused by the physical activity of the test subject are eliminated from this curve, and that it presents an intelligible and accurate picture of the operation of that metabolic process which it is desired to measure by the use of the tagged metabolite.

Figure 5:
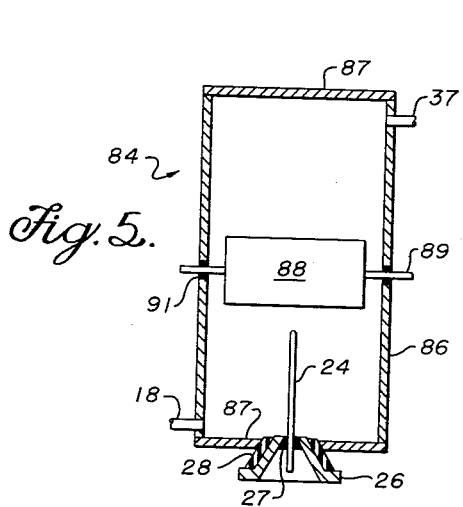
FIGURE 5 is a sectional view of a different embodiment of the ionization and gas-demodulation chamber of the apparatus shown in FIG. 1.

Since mixing provides the means for controlling the timing of the apparatus, other embodiments of the compensating mechanism are possible, for example, the apparatus of FIG. 5. A fixed volume ionization chamber 84 comprised of a cylindrical wall 86 and two end walls 87 defining a cavity communicating with intermediate conduit 18 and conduit 37, has an electrode 24, with associated insulators and shield 27, 28 and 26 similar to counterparts as shown in FIG. 1. A louvre vane 88 is disposed within the cavity of the chamber 84 and is rotatably secured by means of a spit rod 89 which is also disposed transpiercing the side walls of the chamber 84 by means of toroidal electrically insulating inserts 91, made of a flexible material and thus acting also as vacuum seals. Rotation of the spit rod 89 alters the alignment of the vane 88 and causes a change in the degree of mixing undergone by the gases in flowing through the chamber 84.

Figure 6:
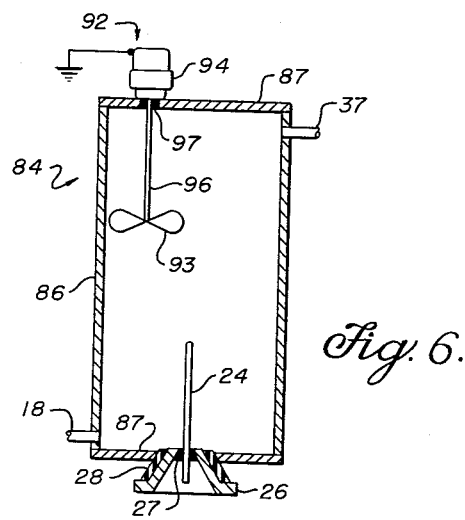
FIGURE 6 is a sectional view of another embodiment of the ionization and gas-demodulation chamber of the apparatus shown in FIG. 1.

Still another embodiment is shown in FIG. 6, wherein a chamber 84 having as counterparts a wall 86, end walls 87, conduits 18 and 37, an electrode 24, insulators 27 and 28 and a shield 26 similiar to those shown in FIG. 5, has an electric fan 92 disposed with a propeller 93 inside the cavity of the chamber 84 and a motor 94 outside. The propeller shaft 96 is disposed transpiercing a wall of the chamber by means of a toroidal vacuum sealing insulator 97, which also spaces the motor 94 insulatingly away from the chamber wall. The degree of mixing in the chamber may thus be controlled by varying the speed of the fan 92.

Figure 7:
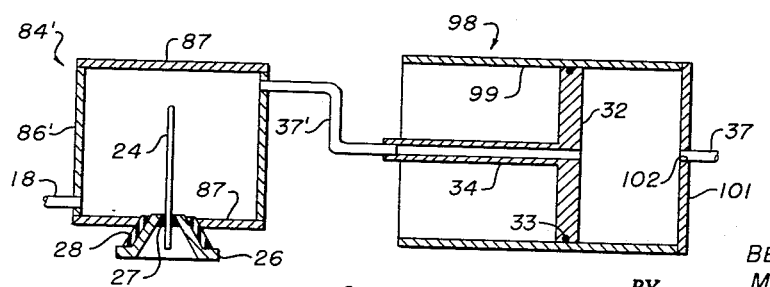
FIGURE 7 is a sectional view of a fourth embodiment of the ionization and gas-demodulation chamber of the apparatus shown in FIG. 1.

A still further embodiment, more convenient for interchange of components, is shown in FIG. 7, wherein a fixed volume ionization chamber 84', having as counterparts a wall 86', end walls 87, conduits 18 and 37', an electrode 24, insulators 27 and 28, and a shield 26, similar to those shown in FIG. 5, is disposed with the conduit 37' connected to the free extremity of the hollow stem 34 of a piston 32. The piston 32 forms the movable wall of a separate mixing vessel 98, which has a side wall 99 and end wall 101 defining, with the piston, a cylindrical cavity. The end wall 101 has an outlet port 102 formed therein for connection with a second segment 37 of the conduit 37'; and a flexible toroidal seal 33, seated in an appropriate recess in the piston, protects the vacuum joint between the piston and the side wall 99 of the vessel. It will be seen that the piston 32 may be translated in relation to the vessel 98 for adjusting the degree of mixing of the gases flowing therethrough.

It will be apparent to those skilled in the art that numerous variations and modifications may be made within the spirit and scope of the invention and thus it is not intended to limit the invention except as defined in the following claims.

What is claimed is:

1. In a method of assaying the metabolic rate of a selected carbon containing substance in a living subject, the steps comprising administering a measured quantity of said substance to said subject which quantity contains a known proportion of radioactive carbon as a constituent thereof, collecting the exhalations of said subject subsequent to administration of said substance thereto, directing said exhalations along a confined path, detecting the degree of radioactivity of said exhalations at a point in said confined path at a plurality of times, and comparing said degrees of radioactivity of said exhalation at said plurality of times whereby changes in the rate of transmission of said substance through the biochemical system of said subject are observed.

2. A method of observing a particular metabolic process in a living subject, comprising the steps administering to said subject a known quantity of a compound metabolizable by said particular process and having as one component a known proportion of radioactive carbon, directing the exhalations of said subject into a continuous flow of carrier air, passing said flow through a sensitive radiation detector, subsequently producing increased intermixing of said exhalations and said carrier air to at least partially disperse localized accumulations of said exhalations in said flow, detecting the carbon dioxide content of said flow, and at least periodically determining the ratio of the radioactivity of said flow to the concurrent carbon dioxide content of said flow.

3. Apparatus for the measurement and recording of a metabolic rate of a living subject, said subject having been administered a radioactively labeled carbonaceous metabolic substance, comprising a gas tight vessel for communicating with the respiratory passages of said subject, means supplying respirable atmosphere to said vessel, a conduit communicating with said vessel for the withdrawal of gases therefrom, radiation detection means detecting the degree of radioactivity of the contents of said conduit at a first point thereof, carbon dioxide detection means detecting the $CO_2$ concentration of the contents of said conduit at a second point thereof, means producing controlled turbulence within said gases to at least partially disperse localized accumulations of said gases in flow therein, and a recorder coupled to said radiation detecting means and to said carbon dioxide detection means and plotting the outputs of said radiation detecting means and said carbon dioxide detection means against a time base.

4. Apparatus for the measurement and recording of a metabolic rate of a living subject as described in claim 3, wherein said means producing controlled turbulence within said gases is comprised of an enlarged portion of said conduit defining a variable volume mixing chamber, said enlarged portion of said conduit having at least one adjustable wall.

5. Apparatus for the measurement and recording of a metabolic rate of a living subject as described in claim 3, wherein said means producing controlled turbulence within said gases is comprised of at least one movable baffle vane disposed within said conduit for the adjustable deflection of said gases in flow therein.

6. Apparatus for the measurement and recording of a metabolic rate of a living subject as described in claim 3, wherein said means producing controlled turbulence is comprised of an air circulating rotatable fan.

7. Apparatus for measuring and recording the metabolic rate of a living subject, said subject having been administered a radioactive metabolic substance, comprising a gas tight respiration vessel for communicating with the respiratory passages of said subject, means supplying a respirable atmosphere to said vessel, an ionization chamber having as elements a gas tight casing defining a cavity, an electrode disposed within said cavity, said electrode having a substantial positive potential in relation to said casing, and a screen grid disposed within said cavity, spaced substantially away from said casing, and surrounding said electrode, said screen grid having a potential different from the potentials of said electrode and said casing; an integrating circuit coupled to said electrode for removing short term fluctuations in the voltage output of said electrode, a first conduit connecting the interior volumes of said respiration vessel and said ionization chamber for the continuous transmission of the gases introduced into said vessel, a carbon dioxide detector, a second conduit connecting said ionization chamber and said carbon dioxide detector for the transmission of said gases thereto, means producing controlled turbulence in said gases in flow through said apparatus, and a recorder coupled to said integrating circuit and to said carbon dioxide detector and plotting the outputs of said ionization chamber and said carbon dioxide detector against a time base.

8. Apparatus for measuring and recording the metabolic rate of a living subject as described in claim 7, wherein said electrode is elongated in form and is disposed transpiercing a wall of said casing, and wherein a generally tubular shield element is provided for shielding said electrode from ionic particles emanating from said casing, said shield element being disposed coaxially sheathing that portion of said electrode that transpierces said casing wall and projects exteriorly thereto, and said shield element being fixed at a potential approximately equal to that of said electrode.

9. Apparatus for measuring and recording the metabolic rate of a living subject as described in claim 7, wherein said recorder has as elements a reference voltage source, a potentiometer for comparing the voltage output of said electrode and the voltage output of said carbon dioxide detector with each other and each with the output of said reference voltage source, switch means for sequentially coupling said potentiometer between successive pairs of said voltage outputs, and means graphically plotting the response of said potentiometer.

10. Apparatus for measuring and recording the metabolic rate of a living subject as described in claim 7, wherein said means producing controlled turbulence in said gases is comprised by the further combination of a housing having a bore formed therein, said bore being closed at one end and open at the other end, and a piston fitting in a gas tight manner within said bore for sliding movement therein, said housing and said piston together defining a variable volume mixing chamber; said combination being interposed at approximately the midpoint of said second conduit for the continuous flow of said gases through said chamber thereof.

11. Apparatus for measuring and recording the metabolic rate of a living subject, said subject having been administered a radioactive metabolic substance, comprising a gas tight respiration vessel for communicating with the respiratory passages of said subject, means supplying a respirable atmosphere to said vessel, an ionization chamber having as elements a gas tight casing defining a cavity, said casing having an inlet and an outlet, an electrode disposed within said cavity, said electrode having a substantial positive potential in relation to said casing, and a screen grid disposed within said cavity, spaced substantially away from said casing, and surrounding said electrode, said screen grid having a potential different from the potentials of said electrode and said casing; an integrating circuit coupled to said electrode, a conduit connecting the interior volumes of said respiration vessel and said ionization chamber for the continuous transmission of the gases introduced into said vessel, a carbon dioxide detector disposed in the path of said gases at a point beyond said electrode in the direction of flow of said gases, means producing controlled turbulence in said gases in flow between said electrode and said carbon dioxide detector for at least partially dispersing the more dense concentrations of carbon dioxide in passage therebetween, and a recorder coupled to said integrating circuit and to said carbon dioxide detector and plotting the outputs of said ionization chamber and said carbon dioxide detector against a time base.

12. Apparatus for measuring and recording the metabolic rate of a living subject, said subject having been administered a radioactive metabolic substance, comprising a gas tight respiration vessel for communicating with the respiratory passages of said subject, means supplying a respirable atmosphere to said vessel, a variable volume ionization chamber having as elements a gas tight casing defining a cavity, said casing having at least one adjustable wall, an electrode disposed within said cavity, said electrode having a substantial positive potential in relation to said casing; a first conduit connecting the interior volumes of said respiration vessel and said ionization chamber, a carbon dioxide detector, a second conduit connecting said ionization chamber and said carbon dioxide detector, and a recorder coupled to said electrode and to said plotting the signals of said ionization chamber and said carbon dioxide detector against a time base.

13. Apparatus for measuring and recording the metabolic rate of a living subject as described in claim 12, wherein said electrode is elongated in form and is disposed transpiercing one wall of said casing, and wherein there is the further combination of a screen grid disposed within said cavity, spaced substantially away from said casing, and surrounding the interiorly projecting portion of said electrode, said screen grid having a potential different from the potentials of said electrode and said casing, and a generally tubular shield element disposed coaxially sheathing that portion of said electrode transpiercing said casing wall and projecting exteriorly thereto, said shield element being fixed at a potential approximately equal to that of said electrode.

14. Apparatus for measuring and recording the metabolic rate of a living subject as described in claim 12, wherein said casing having said adjustable wall is comprised of a housing having a bore formed therein, said bore being closed at one end, and a piston fitting in a substantially gas tight manner within said bore for sliding movement therein.

15. Apparatus for measuring and recording the metabolic rate of a living subject as described in claim 12, wherein said respiration vessel is comprised of a helmet for enclosing at least the head of said subject, said helmet having at least one transparent window formed therein for the visual convenience of said subject and having a collar portion fitting the chest, back and shoulder portions of said subject in a substantially gas tight manner.

16. Apparatus for measuring the metabolic rate of a living subject as described in claim 12, wherein said recorder is coupled to said electrode and said carbon dioxide detector, and wherein said recorder has as elements a reference voltage source, a potentiometer for comparing the voltage outputs of said electrode to the output of said standard cell reference voltage source, switch means for sequentially coupling said potentiometer between successive pairs of said voltage outputs, and means graphically plotting the response of said potentiometer to said successive pairs of voltage outputs.

17. In a method of determining the rate of metabolization of a selected substance in a living subject, said substance having a known proportion of radioactive carbon as a component, the steps comprising administering a measured quantity of said substance to said subject, collecting the expired breath of said subject subsequent to administration of said substance thereto, channeling said expired breath along a confined path, at least periodically measuring the degree of radioactivity of said expired breath at a fixed point in said path, at least periodically measuring the carbon dioxide content of said expired breath, and at least periodically computing the ratio of the degree of radioactivity of said breath to the carbon dioxide content thereof whereby changes in the rate of transmission of said substance through the biochemical system of said subject are observable said changes being substantially correct for changes in the general metabolic level of said subject.

References Cited in the file of this patent

UNITED STATES PATENTS

| | | |
|---|---|---|
| 1,783,451 | Rabinowitch | Dec. 2, 1930 |
| 2,703,079 | Argento | Mar. 1, 1955 |

FOREIGN PATENTS

| | | |
|---|---|---|
| 1,082,004 | France | June 16, 1954 |